Sept. 10, 1963 M. H. LEWIN 3,103,600

AMPLIFIER CHAIN USING TUNNEL DIODES

Filed Aug. 23, 1960

INVENTOR.
MORTON H. LEWIN
BY
H. L. Gordon
AGENT.

United States Patent Office 3,103,600

Patented Sept. 10, 1963

3,103,600

AMPLIFIER CHAIN USING TUNNEL DIODES

Morton H. Lewin, Princeton, N.J., assignor, by mesne assignments, to the United States of America as represented by the Secretary of the Navy Filed Aug. 23, 1960, Ser. No. 51,475
8 Claims. (Cl. 307—88.5)

This invention relates to an amplifier chain using tunnel diodes and more particularly to a high speed digital amplifying system using a plurality of cascaded dener or tunnel diodes.

Dener (degenerate negative resistance) or tunnel diodes, as proposed by L. Esaki in the "Physical Review," vol. 109, January 15, 1958, page 603—604, have been proposed for high speed digital computing elements since they require only a very small amount of power and have the ability to assume two stable states with a fast switching time between those two states.

However, if it is desired to switch a large number of output circuits in response to a plurality of input signals, a very large power gain may be required in the gating circuit which cannot be furnished by a single diode.

An object of this invention is therefore to obtain a large power gain in a tunnel diode gating circuit by means of an amplifier chain using a series of tunnel diodes where the peak current rating of each diode is increased between the input and output.

Another object of this invention is to provide a gating circuit where the logical functions "and," "or," and "threshold" may be performed in a lower state and the output function amplified to drive a plurality of output stages.

Figure 1:
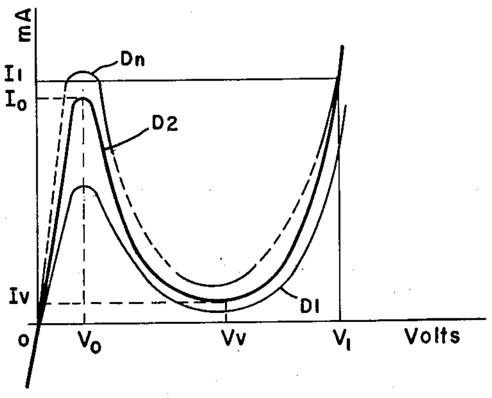
Figure 2:
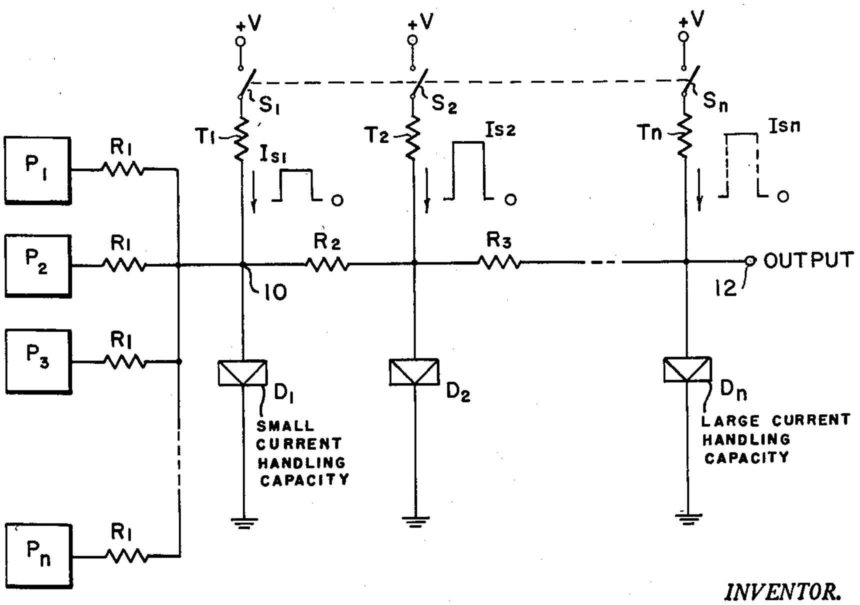

Other objects and many of the attendant advantages of this invention will be readily appreciated as the same becomes better understood by reference to the following detailed description when considered in connection with the accompanying drawings wherein:

FIG. 1 is a graph of the current-voltage characteristic of a dener or tunnel diode; and FIG. 2 is a schematic diagram of an amplifier chain using tunnel diodes in accordance with the invention.

Referring now to the drawings, a typical current-voltage characteristic curve of a tunnel diode having the narrow or tunneling type junction is shown in FIG. 1 with the ordinate in milliamps and the abscissa in volts. Starting from zero, a low voltage, high current, first positive resistance section is shown where the current increases with increasing voltage reaching a peak at $I_0$—$V_0$. A second, negative resistance region is shown where the current decreases with increasing voltage from $V_0$ to $V_v$. A third positive resistance region is shown where the current increases with increasing voltage from beyond $V_v$ past $V_1$.

If a tunnel diode is biased through a relatively constant current source to a current value slightly less than $I_0$, if its initial stable state is on the first positive resistance portion of the characteristic curve, and if an additional current trigger pulse is applied to raise the total current through the diode to $I_1$, a switching action will take place and the diode will switch to the second positive resistance region of the curve marked by $I_1$ and $V_1$. The current gain which is then delivered to the output circuit is proportional to $I_1$ minus $I_v$, the minimum valley current required to keep the diode in a high voltage state without switching back to the low voltage region near the origin. This output current may vary over a wide range from less than 1 milliampere to over 1 ampere.

However, the trigger pulse may be from 10% to 50% of the value of the biasing pulse depending on such factors as the variation of $I_0$ from diode to diode of the same type or the overdrive current applied to the diode to achieve the proper switching speed.

A one milliampere input current will not normally switch a one ampere diode. An amplifier chain is shown in FIG. 2 in a preferred embodiment of the invention to provide the proper power gain to positively accomplish switching.

FIG. 2 is a schematic diagram of the amplifier chain where a trigger pulsing means shown in the form of a plurality of pulse sources $P_1$, $P_2$, to $P_n$ is applied to resistors $R_1$ for switching tunnel diode gate $D_1$. This summation type of logical input on the amplifier chain may be a majority logic or threshold circuit, an "and" gate, or an "or" gate. Tunnel diode $D_1$ may, for example, be a low powered diode having a peak current rating of 1 milliampere or less and tunnel diodes $D_2$—$D_n$ may have peak current ratings of 5 milliamperes to 1 ampere or more. A series of impedances shown as resistors $R_2$, $R_3$, etc., are connected in series between the input 10 and output 12 and separate each parallel connected tunnel diode $D_1$, $D_2$, and $D_n$, so that they may individually switch.

A biasing means is shown in one form as a series of current pulses $I_{s1}$, $I_{s2}$, to $I_{sn}$ where each current pulses its respective diode. If the current pulse $I_{s1}$ is somewhat below $I_0$ and the total current into $D_1$ is greater than $I_0$ or $I_1$, $D_1$ will switch along line $I_1$ to $V_1$ so that an output voltage is developed across resistor $R_2$ which will switch tunnel diode $D_2$, etc., along the line, to output 12. Since each tunnel diode is greater in its current output than the previous one in line, the input signals are amplified and a large current is available at output 12.

The maximum fan-out or current gain is therefore the output current of $D_n$ divided by the current increment required to trigger $D_1$ so that a sufficiently large number of stages may be used in order to obtain the required output current. The current sources $I_{s1-n}$ may be simple current sources or consist of a high voltage V in series with high resistances $T_1$, $T_2$, and $T_n$ where the voltage V is large compared to $V_1$ and the resistors $T_1$, $T_2$, and $T_n$, are large compared with the impedance of the dener diode in the high voltage state.

A symbolically illustrated bias pulsing means which may operate at a kilomegacycle rate is shown as a plurality of synchronously operated switches $S_1$, $S_2$, and $S_n$ for each biasing pulse $I_{s1-n}$.

While the circuit as shown represents a preferred embodiment of the amplifier chain, typical values of a circuit are given by way of example.

| | |
|---|---|
| Resistors $R_1$ | 2,000 ohms. |
| Resistor $R_2$ | 400 ohms. |
| Resistor $R_3$ | 100 ohms. |
| Resistor $T_1$ | 10,000 ohms. |
| Resistor $T_2$ | 2,000 ohms. |
| Voltage V | 10 volts. |
| Diode $D_1$ | 1 ma. tunnel diode. |
| Diode $D_2$ | 5 ma. tunnel diodes. |

While tunel diode $D_1$ may be an "and," or "or," or "threshold" gate and the biasing point may be considerably below $I_0$, the other diodes $D_2$ through $D_n$ are simple one input or "or" gates so that they may be biased by the $I_{s1-n}$ pulses very close to their $I_0$.

While biasing close to $I_0$ may be desirable, for practical reasons, such as variations in the $I_0$ of a number of diodes, there must be a substantial difference between the biasing current and the total current required to switch each diode, so that a respectable current output is required from each stage in the amplifier chain in order to switch the next stage and thereby achieve a relatively large current output.

The amplifier chain as disclosed provides a low power input and high power output to drive a plurality of logical circuits at high repetition frequencies with a minimum power loss per stage.

Obviously many modifications and variations of the present invention are possible in the light of the above teachings. It is therefore to be understood that within the scope of the appended claims the invention may be practiced otherwise than as specifically described.

What is claimed is:

1. An amplifier chain using tunnel diodes comprising an input and an output, a series of tunnel diodes biased in the forward direction and connected as amplifiers between said input and output, the current ratings of said tunnel diodes increasing progressively through said series between said input and said output, a series of impedances connected between said input and ouptut and said diodes, and a pulsing means connected to said diodes for applying a current to said diodes whereby said diodes may be switched from a low voltage state to a high voltage state for power gain.

2. An amplifier chain for tunnel diodes comprising a high impedance input suitable for triggering by a plurality of low power signals, a low impedance output for driving a high power load, at least two impedances connected in series between said input and output, at least two tunnel diodes having progressively greater peak current ratings connected in parallel across said input and output and separated from each other by said impedances, and means for pulsing each tunnel diode with a biasing current proportional to the peak current rating of said diode whereby a large power gain from said input to said output may be provided for said signals.

3. An amplifier chain according to claim 2 and further characterized by said impedances comprising resistors.

4. An amplifier chain according to claim 2 and further characterized by said pulsing means comprising a high voltage source and a large series resistance whereby a constant current source for each diode is simulated.

5. An amplier chain using tunnel diodes comprising an input, an output, a plurality of tunnel diodes connected between said input and said output, said plurality of tunnel diodes having peak current ratings which are progressively greater between said input and said output; a series of impedances connected between said input and said output and separating said tunnel diodes from one another, and means for switching said diodes between two stable states.

6. An amplifier chain using tunnel diodes comprising an input, an output, means for providing trigger pulses at said input, a plurality of tunnel diodes connected in parallel as amplifiers between said input and output, said diodes having progressively increasing peak current ratings between said input and output; a plurality of series-connected resistors connected with a resistor between each two of said tunnel diodes, said resistors having decreasing values of resistance between said input and output; and means for applying a biasing current to each said diode, said biasing current being proportional to the peak current rating of the particular diode to which the particular current is applied.

7. In combination, a pair of tunnel diodes, the first exhibiting a substantially lower current peak in its current versus voltage characteristic than the second; a signal input terminal at one electrode of the first tunnel diode; a signal output terminal at the corresponding electrode of the second tunnel diode; impedance means coupling said two electrodes; and means for supplying an operating current to both tunnel diodes of a value such that both are in the same voltage state in the absence of an input signal.

8. In combination, a first tunnel diode having a given current peak in its characteristic of current versus voltage; a second tunnel diode having a substantially higher current peak in its characteristic of current versus voltage than the first tunnel diode; a resistor coupling one electrode of the first tunnel diode with the corresponding electrode of the second tunnel diode; a common terminal connected to the other electrode of both tunnel diodes; means coupled to the first mentioned electrodes of both tunnel diodes for supplying operating current to both tunnel diodes; an input terminal connected to the tunnel diode exhibiting the lower peak in its current versus voltage characteristic; and an output terminal coupled to the tunnel diode exhibiting the higher peak in current versus voltage characteristic.

References Cited in the file of this patent

UNITED STATES PATENTS 2,585,571 Mohr ---------------- Feb. 12, 1952

FOREIGN PATENTS 596,131 Canada ---------------- Apr. 12, 1960